United States Patent Office 2,838,899
Patented June 17, 1958

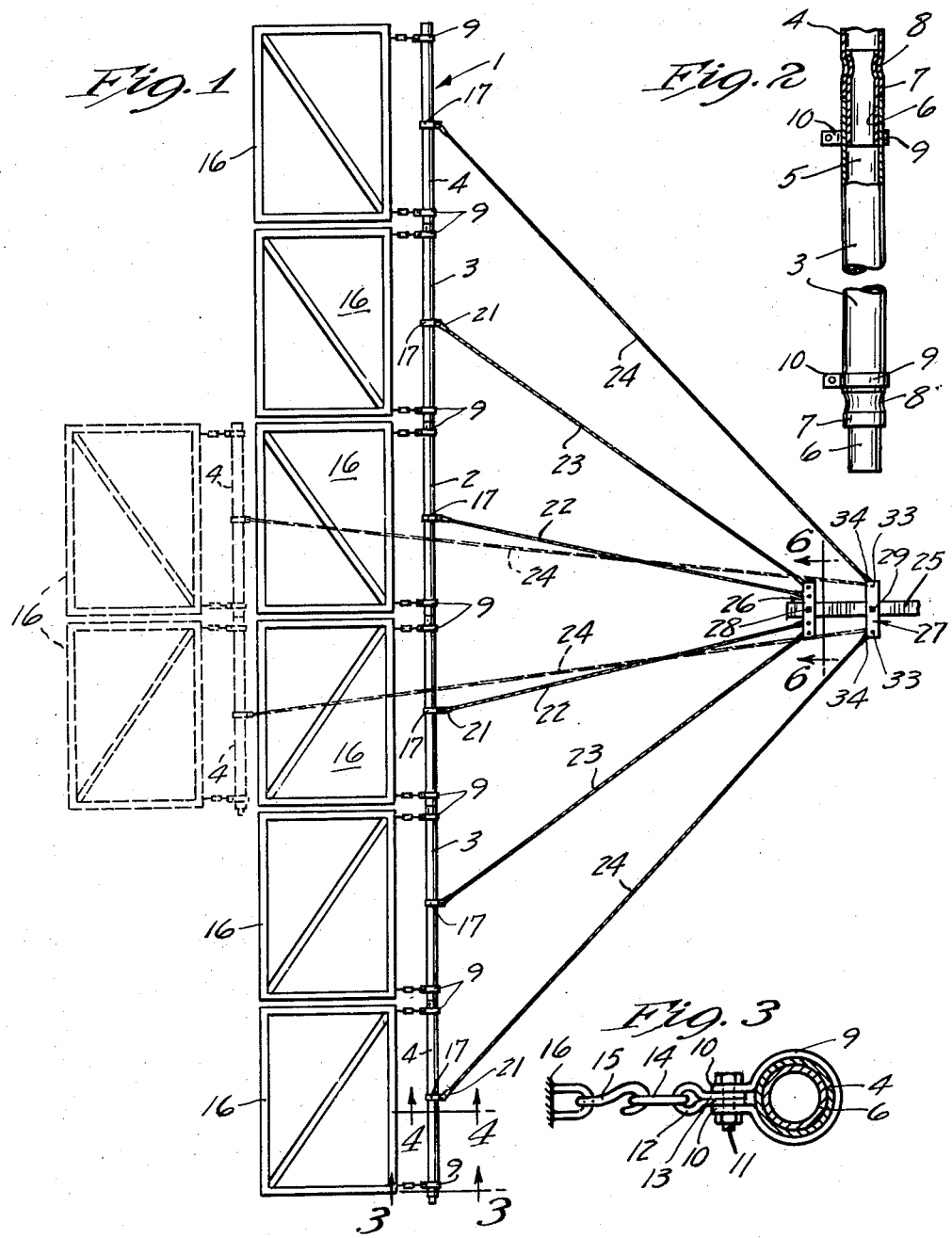

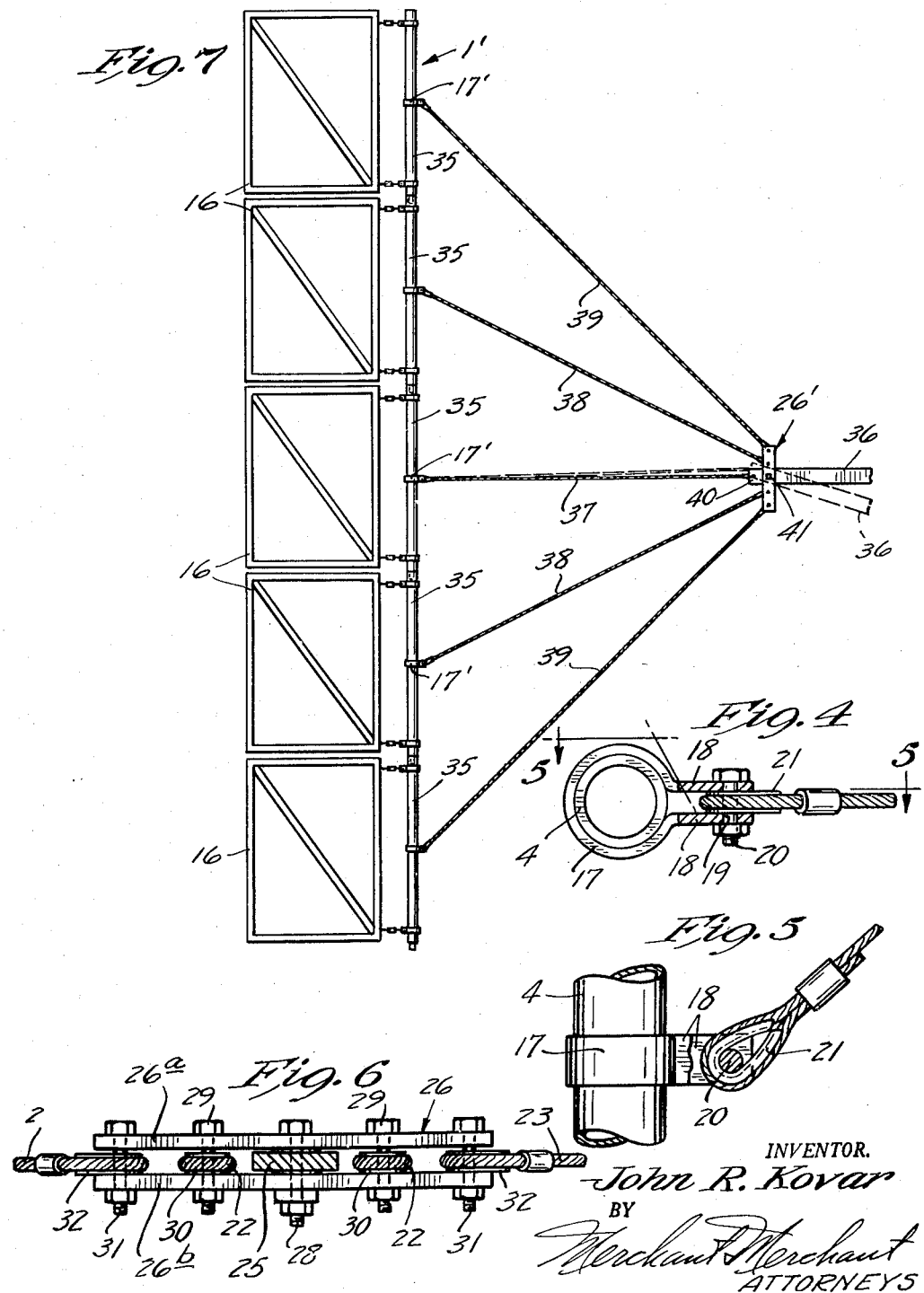

2,838,899

DRAWBAR STRUCTURE

John R. Kovar, Anoka, Minn.

Application October 3, 1955, Serial No. 538,015

1 Claim. (Cl. 55—84)

My invention relates generally to coupling devices and more particularly to drawbars for use with agricultural implements, graders and the like.

More specifically, my invention is in the nature of a drawbar structure which comprises a plurality of cooperating drawbar sections and means whereby the sections may be placed end-to-end to draw or tow a plurality of implements in side-by-side relationship, or disposed so that said implements are in tandem relationship, if desired.

An important object of my invention is the provision of a drawbar structure which may be quickly and easily lengthened or shortened according to the job requirements.

Another object of my invention is the provision of a drawbar structure which will follow a pulling device, such as a tractor, around curves without undue strain being placed upon any given portion over another thereof.

Another object of my invention is the provision of a drawbar as set forth which is relatively simple and inexpensive to manufacture, which is efficient in operation, and which is relatively light in weight, rugged in construction and durable in use.

The above and still further highly important objects and advantages of my invention will become apparent from the following detailed specification, appended claim and attached drawings.

Referring to the drawings, which illustrate the invention, and in which like characters indicate like parts throughout the several views:

Fig. 1 is a view in plan of a drawbar structure made in accordance with my invention and diagrammatically showing the same coupled to a plurality of agricultural implement sections;

Fig. 2 is an enlarged fragmentary view in plan of a pair of drawbar sections of my invention, some parts being broken away and some parts shown in section;

Fig. 3 is an enlarged detail partly in transverse section and partly in side elevation taken substantially on the line 3—3 of Fig. 1;

Fig. 4 is an enlarged fragmentary section taken substantially on the line 4—4 of Fig. 1;

Fig. 5 is a fragmentary detail partly in plan and partly in section taken substantially on the line 5—5 of Fig. 4;

Fig. 6 is an enlarged fragmentary view partly in front elevation and partly in section taken substantially on the line 6—6 of Fig. 1; and Fig. 7 is a view corresponding to Fig. 1 but showing a modified arrangement.

Referring with greater detail to the arrangement illustrated in Figs. 1-6, the numeral 1 indicates in its entirety an elongated drawbar comprising a central drawbar section 2, a pair of intermediate drawbar sections 3, each disposed at an opposite end of the drawbar section 2, and a pair of outer drawbar sections 4 each disposed axially outwardly of an intermediate section 3. It will be noted by reference to Fig. 1 that the intermediate and outer sections 3 and 4 respectively are identical in structure and length, and that the central section 2 is of greater length than the intermediate and outer sections 3 and 4 respectively.

Each of the various drawbar sections 2, 3 and 4, as exemplified in Fig. 2, is made from a length of tubular material such as steel or the like whereby to define an axial recess 5 at one end thereof which is adapted to slidably receive an axially extending male element in the nature of a diametrically reduced relatively short tube 6, which projects axially outwardly from the adjacent end 7 of each drawbar section, and which is locked in the end portion 7 by means of crimping or the like as indicated at 8. The tubes 6 slide relatively freely into and out of the recesses 5, but fit sufficiently snugly within the recesses to provide a relatively rigid structure. Clamping elements 9 are mounted on the intermediate and outer sections 3 and 4 respectively, adjacent the opposite ends thereof and are provided with spaced rearwardly projecting ears 10 having aligned apertures through which extend nut-equipped clamping bolts 11. By reference to Fig. 1 it will be seen that the central drawbar section 2, in addition to having clamping elements 9 adjacent its opposite ends, also has an additional pair thereof at its intermediate portion. As shown in Fig. 3, each clamping element 9 is adapted to support a looped anchoring strap 12, the opposite ends 13 of which are contained between the ears 10. The ends 13 may be assumed to have suitable aligned apertures therein through which the clamping bolt 11 extends. Anchoring links 14 extend one each through the looped portion of each anchoring strap 12 for connection to the coupling hooks or the like 15 that are connected to opposite end portions of cultivating implements, such as rake harrows and the like 16 illustrated diagrammatically in Fig. 1. The implements 16 are of the type in common use for soil cultivation, road grading and the like, and do not in themselves comprise the instant invention. For this reason, and for the sake of brevity, detailed showing and description thereof is believed unnecessary.

Each of the drawbar sections 3 and 4 is provided with a clamping element or loop 17 similar to the clamping elements 9, but having forwardly extending ears 18 with aligned apertures 19 therein, see Figs. 1, 4 and 5. It will be noted by reference to Fig. 1, that the elements or loops 17 are disposed substantially at the central portions of the drawbar sections 3 and 4, and that the drawbar section 2 is provided with a longitudinally spaced pair of the clamping elements or loops 17, these loops being substantially equally spaced from the center of the drawbar section 2. Nut-equipped bolts 20 extend through the aligned apertures 19 in the forwardly projecting ears 18 and through eyelets 21 disposed between the cooperating ears 18 of each clamping loop 17. I provide a plurality of flexible draft elements preferably in the nature of cables 22, 23 and 24, for the purpose of connecting the drawbar to a pulling means such as a tractor or the like. These cables, which are preferably made from steel wire or the like, but which may, if desired, be in the nature of link chains, comprise a portion of mechanism for attachment to the pulling means, such mechanism further including a rigid draft member 25 that is adapted to be rigidly anchored to a tractor in the well known manner. This mechanism further includes a pair of generally transversely extended equalizer bars 26 and 27 the former of which is pivotally secured intermediate its ends to the rear end portion of the draft member 25 on a generally vertical axis, and as indicated at 28. The equalizer bar 27 is disposed in forwardly spaced relationship to the equalizer bar 26 and is likewise pivotally secured to the draft member 25 on a generally vertical axis, and as indicated at 29.

As illustrated in Fig. 6, the equalizer bar 26 comprises a pair of cooperating bar sections 26a and 26b, the former of which is disposed above the draft member 25, and the latter of which is disposed thereunder, the pivotal connection 28 being in the nature of a nut-equipped bolt extending through suitable aligned apertures in the draft member 25 and the central portions of the equalizer bar sections 26a and 26b. A pair of nut-equipped anchoring bolts 29 extend through aligned apertures in the bar sections 26a and 26b in outwardly spaced relation to the pivot bolt 28 and inwardly of the outer ends of the equalizer bar sections. A pair of eyelets 30 similar to the eyelets 21 is disposed between the bar sections 26a and 26b, each being positioned to receive a different one of the anchoring bolts 29. The front ends of the cables 22 are each anchored to one of the eyelets 30 at their front ends, and to the eyelets 21 of the anchoring loops 17 associated with the central drawbar section 2, see Fig. 1. Anchoring of the cables 22 to the eyelets 21 and 30 is accomplished in the usual manner as shown in Figs. 4 and 5. A second pair of nut-equipped anchoring bolts 31 extend through suitable aligned apertures in the extreme end portions of the equalizer bar sections 26a and 26b and through eyelets 32 similar to the eyelets 21 and 30. The cables 23 are anchored at their rear ends to the eyelets 21 of the anchoring loops 17 associated with the drawbar sections 3, and at their front ends to the eyelets 32.

Although not shown as such, it may be assumed that the forwardly disposed equalizer bar 27 is of the same general structure as the equalizer bar 26, comprising upper and lower bar sections, the top one thereof being shown in Fig. 1. Anchoring bolts 33 extend through suitable aligned apertures in the bar sections of the equalizer bar 27 and through eyelets 34 disposed therebetween, these eyelets anchoring the forward ends of the cables 24. The rear ends of the cables 24 are secured to eyelets 21 between the forwardly projecting ears 18 of the clamping loops 17 associated with the drawbar elements 4. With reference particularly to Fig. 1 it will be seen that the cables of each pair thereof converge forwardly toward their connections with their respective equalizer bars. The arrangement above-described enables the equipment connected to the drawbar 1 to be drawn over the area to be treated, with a substantially equal pull on each of the drawbar sections, and permits travel about an arc having a relatively small radius without disturbing this condition. When it is desired to move the structure illustrated in Fig. 1 through a relatively narrow space, it is merely necessary to move the outer sections 4 together with the implements drawn thereby laterally out of engagement with the drawbar sections 3 and move the same to a tandem relationship with the implements drawn by the central drawbar section 2, as indicated by dotted lines in Fig. 1. It will be appreciated that, if desired, the implements may be disposed in the above-described tandem relationship for working the field as well as for facilitating passage through relatively narrow gates and the like. The pivotal connections of the equalizer bars to the draft member 25 operate to keep all of the cables 22, 23 and 24 tight when negotiating curves or turning corners.

In the modified arrangement illustrated in Fig. 7, a drawbar 1' is shown as comprising a plurality of identical drawbar sections 35 that are identical to the drawbar sections 3 and 4 of Fig. 1. These drawbar sections are each coupled to an implement section 16 in the same manner as above-described and are connected to a draft member 36 by flexible cables or chains 37, 38 and 39.

The cable 37 is connected at its rear end by means of an eyelet to a clamping loop 17' secured to the central drawbar section 35. At its front end, the cable 37 is secured to the extreme rear end of the draft member 36 as indicated at 40. An equalizer bar 26' is identical to the equalizer bar 26 of Figs. 1 and 6, and is pivotally secured at its central portion to the draft member 36, as indicated at 41. The rear ends of the cables 38 are secured by means of eyelets to clamping loops 17' associated with the intermediate drawbar sections 35, and at their front ends to the drawbar 26' intermediate opposite sides of the draft member 36 and the outer ends of the equalizer bar 26'. The rear ends of the cables 39 are secured by means of eyelets to clamping loops 17' associated with the outermost drawbar sections 35, the front ends of the cables 39 being secured by means of eyelets to the opposite end portions of the equalizer bar 26'. The arrangement whereby the cables 38 and 39 are secured to the equalizer bar 26' is identical to that illustrated in Fig. 6, and the entire structure illutstrated in Fig. 7 operates in the same manner as that of Fig. 1.

My novel drawbar structure enables the operator to utilize any given number of units as desired, and eliminates a necessity for right and lefthand drawbar sections.

My invention has been thoroughly tested and found to be completely satisfactory for the accomplishment of the objectives set forth; and while I have shown a commercial embodiment of my novel drawbar structure and a single modification thereof, it will be understood that the same is capable of further modification without departure from the spirit and scope of the invention as defined in the claim.

What I claim is:

In a device of the class described, a relatively long drawbar comprising a central drawbar section, a pair of intermediate sections, and a pair of outer sections, each of said sections having an axial recess at one end and an axially extending male element at its other end, all but one of said male elements being adapted to be received in the recess of the adjacent section, anchoring means on each of said sections for attachment of a cultivator implement thereto, and mechanism for securing the drawbar to a pulling means, said mechanism comprising a rigid draft member in forwardly spaced relationship to the drawbar, a pair of relatively short equalizer bars pivotally mounted intermediate their ends to said draft member on generally vertical axes spaced in the direction of movement thereof, a pair of forwardly converging flexible draft elements secured at their front ends to one of said equalizer bars intermediate the center and opposite ends thereof and at their rear ends to said central section, a second pair of forwardly converging flexible draft elements secured at their front ends to the outer ends of said one of the equalizer bars and at their rear ends each to a different one of said intermediate drawbar sections, and a third pair of forwardly converging flexible draft elements each secured at its front end to a different end portion of the other of said equalizer bars and at its rear end to one of the outer drawbar sections.

References Cited in the file of this patent

UNITED STATES PATENTS

| | | |
|---|---|---|
| 1,722,540 | Rasmussen | July 30, 1929 |
| 2,131,667 | Noble | Sept. 27, 1938 |
| 2,652,674 | Lee | Sept. 22, 1953 |
| 2,716,853 | Schulte | Sept. 6, 1955 |